INVENTORS.
GERALD R. BROPHY
ARTHUR J. MILLER
BY
ATTORNEY.

AS NORMALIZED | AS NORMALIZED AND REHEATED

INVENTORS.
GERALD R. BROPHY
ARTHUR J. MILLER
BY
ATTORNEY.

AS NORMALIZED | AS NORMALIZED AND REHEATED

INVENTORS.
GERALD R. BROPHY
ARTHUR J. MILLER
BY
ATTORNEY.

Patented Oct. 19, 1948

2,451,469

UNITED STATES PATENT OFFICE 2,451,469

STEELS AND STRUCTURAL EMBODIMENTS THEREOF FOR USE AT LOW TEMPERATURES

Gerald Robert Brophy, Westfield, and Arthur John Miller, Elizabeth, N. J., assignors to The International Nickel Company, Inc., New York, N. Y., a corporation of Delaware Application August 2, 1946, Serial No. 687,876

12 Claims. (Cl. 148—31)

This invention relates to the production of alloy steels and structural embodiments thereof having the special property of good impact resistance at very low temperatures.

The special property of good impact resistance at low temperatures is of material importance in meeting safety factor requirements of certain installations. Typical of these is that prescribed by recent developments in the petroleum and chemical industries involving primarily the production, processing and storage of fluids, such as liquefied gases, at extremely low temperatures. The latter may be of the order of about minus 310° F. The requirement of large capacity tanks and associated equipment in the servicing of liquefied gases prescribes for safety that the metal of the tanks and of equipment such as valves, pumps, and piping shall have particularly good impact resistance at the low operating temperatures. Thus, the American Society of Mechanical Engineers' Boiler Construction Code requires that the metal have an impact resistance of 15 foot-pounds at the operating temperature. Heretofore, known commercial alloys and steels of the ferritic type have proven inadequate in meeting the special and stringent requirements by reason of their substantial embrittlement at the low temperatures involved.

The ferritic type of steels proposed by the prior art for use at low temperatures have included compositions having preferred nickel contents generally of about 3.5% or less which have shown high impact resistance at certain ranges of moderately low temperatures. High impact resistance in the proposed ferritic steels has proven, however, to be attainable only within an upper range of frigid temperatures, i. e., from about normal room temperature down to approximately minus 240° F. The proposed ferritic steels are characterized by a very substantial sharp drop in impact resistance on entering the extreme lower range of frigid temperatures of from below about minus 240° F. to minus 310° F. and lower, particularly below minus 260° F. These steels are accordingly structurally unsuited to meet the engineering requirements of lower temperature operations. Examples of the prior art proposals are found in the disclosures of U. S. Patent No. 2,337,049 to Jackson and U. S. Patent No. 2,244,064 to Hodge.

It is a purpose of the present invention to provide a ferritic steel having properties such as to afford adequate Charpy impact values above 15 foot-pounds, and usually above 20 foot-pounds, extending throughout the full lower temperature range, especially within the aforementioned extreme lower temperature range down to at least minus 320° F.

As a solution to the problem of more successfully meeting the engineering requirements of the character of installations aforesaid, an object of the present invention is to provide a ferritic alloy steel having high impact resistance at very low temperatures.

A further object is to provide a nickel alloy steel having a nickel content particularly effective in unexpectedly raising the impact resistance in the extended lower frigid temperature range capable of economical production and readily weldable.

It is another object of the invention to provide a ferritic nickel alloy steel having a Charpy keyhole notch impact toughness of at least 15 foot-pounds, and usually at least 20 foot-pounds, at sub-atmospheric temperature down to at least about minus 320° F.

It is a further object of the invention to provide a ferritic nickel alloy steel having a nickel content which insures notch impact toughnesses which do not decrease from room temperature to minus 320° F. by more than about 35%.

Other objects include specific heat treatments of the ferritic alloy steel of the invention operating to enhance the desired properties and the structural embodiment of the improved ferritic alloy steel in apparatus of the character referred to so as to possess therein adequate ductility and high impact resistance, above about 20 foot-pounds Charpy keyhole notch test, at temperatures as low as minus 310° F. and even lower.

The invention further contemplates the use of advantageous specific alloy steels and treatments, including the use of specific treating agents and low carbon content, contributing to the obtaining of impact resistance well above the Charpy impact values required both for normal and also for low temperatures of the order referred to. The alloy steel contemplated by the invention is, moreover, suited to the production of sheets, plates and other wrought forms, as well as castings. It is readily heat treated and has good welding characteristics.

Other objects and advantages of the invention will become apparent to those skilled in the art from the following description of specific disclosures embodying the invention taken in conjunction with the drawings.

In accordance with the present invention, parts of apparatus subjected in use to temperatures below minus 240° F., particularly below minus 260° F., are made of a ferritic nickel alloy steel having in its broader aspects a nickel content of at least about 8% nickel and up to about 20% nickel, but preferably not exceeding about 15% nickel. In addition to iron, the steel may have a carbon content up to about 0.2%, preferably not exceeding about 0.15%. A satisfactory range of carbon content is 0.03% to 0.12%. Silicon in amounts usually up to about 0.3% and manganese in amounts up to about 1.25% or even more, preferably about 0.3% to 0.8%, may also be present in the steel. Sulfur and phosphorus in normal amounts, for example, up to about 0.04% and about 0.03%, respectively, may also be present. It is not intended to exclude the usual small amounts of impurities and minor constituents common to steel. After proper heat treatment, the carbon content given as a suitable range is found to be not too critical in its influence upon the enhanced impact resistance values which is here the important objective, provided the carbon content does not substantially exceed about 0.2%, preferably not over about 0.15%. Increased carbon contents approaching about 0.2% are not undesirable from the viewpoint of impact resistance at low temperatures after the steel has been normalized and given a subsequent reheating operation contemplated by the invention and described more fully hereinafter. Increased carbon contents, however, may not be desirable from the welding viewpoint as they tend to decrease ductility and to increase cracking susceptibility near the weld. An appropriate reheating treatment after welding will, however, restore ductility, particularly when the reheating treatment is prolonged. As discussed in further detail hereinafter, aluminum and/or titanium may be added to the molten steel, preferably in amounts up to about 0.1% of each.

The alloy steels of the present invention are cast in conventional manner. Ingots thereof, cast from metal preferably treated with a small addition of aluminum or titanium or both, can then be rolled, forged or otherwise hot formed into sheets, plates, bars or shapes suitable for the fabrication of the desired wrought structural element.

Figure 1:
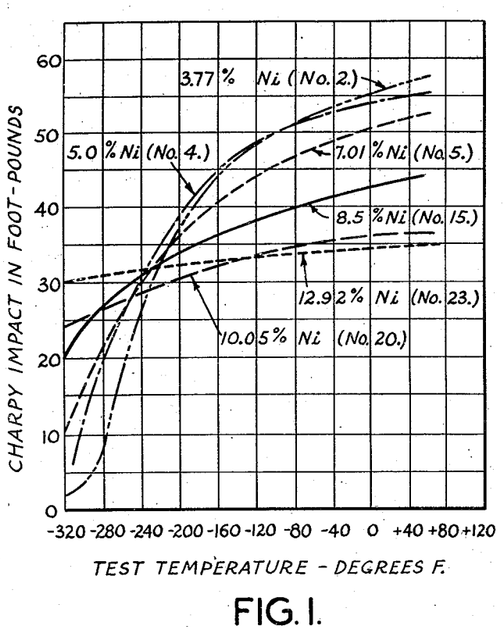
Fig. 1 is a diagrammatic chart showing the test results obtained on comparative and representative ferritic alloy steels of varying nickel content in the "as normalized" condition and indicating the Charpy keyhole impact resistance over an extended temperature range, and indicative of the distinct characteristics of the steels provided by the present invention as compared to those of steels having lower nickel contents.
Figure 2:
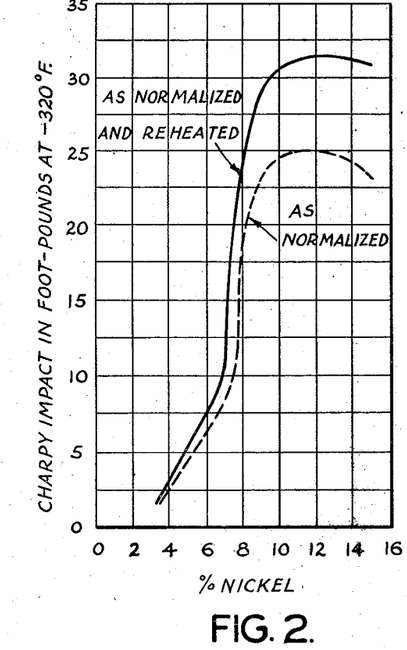
Fig. 2 is a chart showing test results obtained at minus 320° F. with different nickel contents in ferritic alloy steels of about one-inch section size in the "as normalized" and in the "as normalized and reheated" conditions, and showing the effect of nickel on the impact resistance as indicated by the Charpy keyhole notch impact test.

We have found that an unexpected reversal in the effect of the nickel content upon the notch impact strength takes place when the temperature is lowered to below about minus 240° F., and this reversal is very pronounced at temperatures below minus 260° F. The reversal is illustrated in one manner in Fig. 1 which depicts by curves the impact strength of various normalized ferritic steels, containing the indicated amounts of nickel, at various temperatures from room temperature (about plus 70° F.) down to about minus 320° F. It will be noted that, in general, the impact strength above about minus 220° F to minus 240° F. varies inversely with the nickel content, i. e., the lower the nickel content, down to at least about 3%, the higher the notch impact strength. Below about minus 240° F., and particularly below about minus 260° F., the effect is reversed and the impact strength varies directly with the nickel content, i. e., the higher the nickel content of the ferritic steels, up to about 20% but preferably not exceeding about 15%, the higher the notch impact strength. The beneficial effect of nickel on the impact properties at temperatures below about minus 260° F. is not directly proportional to the nickel content. On the contrary, the effect unexpectedly becomes very pronounced when the nickel content is about 8%. This is illustrated in Fig. 2 which depicts by curves the effect of nickel on the Charpy impact strength at minus 320° F. of ferritic steels in the "as normalized" and in the preferred "as normalized and reheated" conditions contemplated by the invention and described in more detail hereinafter. As illustrated by the data presented hereinafter, the values are generally above the peaks of the curves of Fig. 2. The reversal in the effect of nickel at low temperatures and the unexpected sudden increase at about 8% in the beneficial effect of nickel at low temperatures are illustrated in another manner in Fig. 3 which by curves shows the marked decrease in the percentage loss of notch impact strength that occurs in going from room temperature to minus 320° F. when the ferritic steel contains at least about 8% of nickel, particularly over 10% nickel.

Figure 4:
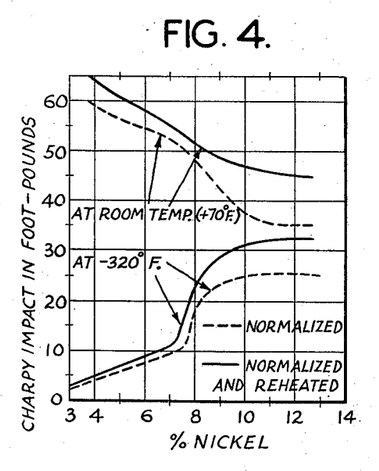
Fig. 4 is a chart showing the unexpected reversal in the effect of increasing amounts of nickel from 3% to 13% on the impact resistance at minus 320° F. compared to the effect of increasing amounts of nickel from 3% to 13% on impact resistance at room temperatures.
Figure 5:
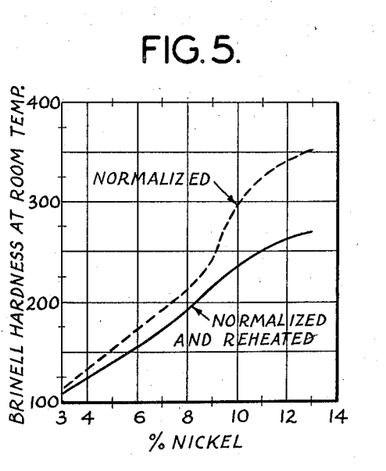
Fig. 5 is a similar chart showing the effect of like amounts of nickel on the hardness of ferritic steels at room temperature.

A demonstration of the anomaly and unexpectedness of the results obtained by the invention is that while the hardness of the steels increases with increasing nickel content, the notch impact strength also increases at low temperatures below about minus 240° F., particularly below about minus 260° F. This is contrary to what would be expected from the relationship between hardness and impact strength at room temperature where the notch impact strength decreases with increasing nickel content and with increasing hardness. The foregoing is illustrated in Figs. 4 and 5. The curves in Fig. 4 show the relationship between impact strength and the nickel content of ferritic steels in the "as normalized" and "as normalized and reheated" conditions. The two upper curves show that at room temperature the impact strength decreases with increasing nickel content in steels in either condition, the decrease becoming particularly marked at about 8% nickel. The two lower curves show that at minus 320° F. the effect is unexpectedly reversed and that a marked increase in impact strength occurs when the nickel content is increased to above about 8%. A comparison of the upper pair of curves with the lower pair also illustrates the marked decrease in loss of impact strength in dropping from room temperature to low temperatures which is obtained when the nickel content is at least 8% and particularly when it exceeds about 10%. The convergence of the pairs of curves in Fig. 4, rather than approximate parallelism, is contrary to expectations based on the known metallurgical facts, evidenced by the upper pair of curves in Fig. 4, the curves in Fig. 5 and a study of the microstructures.

Before placing the ferritic nickel steel, and articles made thereof, into service at low temperatures, it is very preferable that the steel be in a heat treated condition resulting from a normalizing treatment followed by a treatment slightly above the minimum temperature where stable austenite is formed, i. e., austenite that will be substantially retained on cooling to the service temperature. The treatment after normalizing should be below the temperature where a substantial amount of ferrite dissolves and causes the formation of unstable austenite. This latter maximum temperature of treatment is below the $Ac_1$ temperature as conventionally determined by the standard dilatometric method. The treatment after normalizing can be termed a "stable austenite-forming treatment" or "stable-austenitizing" but for convenience is referred to herein as a "reheating" treatment and should be distinguished from a drawing or tempering treatment which by definition is conducted below the temperature where austenite begins to reform on heating. A particularly satisfactory treatment comprises a prenormalizing or conditioning treatment followed by a normalizing treatment and then the reheating treatment. This sequence is preferably followed by a drawing treatment or a second reheating treatment to obtain further improved properties as illustrated by the upper curve in Fig. 7. The cooling rate between each treatment is usually air cooling but can be more rapid, for example, oil quenching. Prenormalizing is accomplished by heating the solid steel above the upper critical temperature ($Ac_3$), the approximate location of which is indicated by the line AB in Fig. 6 for different nickel contents, preferably well above said temperature, say at least about 200° F. above said temperature, for at least one hour per inch of cross section. The steel may then be air cooled. Normalizing is accomplished by heating the steel above the upper critical temperature (line or curve AB) for about one hour or more per inch of thickness and the cooling to develop preferably a fine grained, martensitic structure with a minimum of ferrite. When prenormalizing is employed, the normalizing temperature is below the prenormalizing temperature but above the line AB, preferably at least about 100° F. lower than the prenormalizing temperature. Normalizing temperatures about 50° F. to 150° F. above the line AB give satisfactory results although as shown by the data presented hereinafter temperatures as much as 250° F. above the line AB produce satisfactory results, particularly when preceded by a prenormalizing treatment at a higher temperature. While cooling in air from the normalizing temperature is usually sufficient, even better results can be obtained by liquid quenching, e. g., oil quenching. When air cooled or quenched from the prenormalizing temperature and/or the normalizing temperature, the steels have a martensitic structure which apparently also contains a smaller quantity of relatively unstable austenite in an amount dependent upon the nickel content of the steel for a given cooling rate. In the "as normalized" condition, the steels exhibit satisfactory notch impact resistances of at least 15 foot-pounds, and usually about 20 foot-pounds, at about minus 320° F. However, much higher impact strengths can be obtained by the preferred reheating treatment. The reheating treatment to form a small amount of stable austenite comprises treating the steel for about one hour to five hours, or more per inch of thickness at a temperature, for the particular nickel content, within or very near the zone CDEF of Fig. 6. Temperatures within the shaded zone C'D'E'F' for the particular nickel content are preferred and produce high impact values of about 30 to 40 foot-pounds and even higher at about minus 320° F. in moderate sections. Temperatures within the unshaded portions of the zone CDEF produce satisfactory results, usually over about 22 foot-pounds at about minus 320° F. in moderate sections. Temperatures within the unshaded portion of the zone CDEF but within about 25° F. of the shaded zone C'D'E'F' produce about 25 foot-pounds or more at minus 320° F. for nickel contents of 8% to 10% and produce about 30 foot-pounds or more at minus 320° F. when the nickel content is about 11% to 15% of the steel. Acceptable impact toughness of at least 15 foot-pounds at minus 320° F., however, can be obtained as much as 25° F. above or below the zone CDEF. When the term "reheated" or "reheating" is employed herein, it refers to a reheating treatment such as has been described. The reheating treatment aims to develop, by reheating at least as high as within 25° F. of the bottom of the zone CDEF but not more than about 25° F. over the top of said zone, a structure comprised of small islands of austenite of about eutectoid composition which have a high degree of stability at low temperatures, said islands being well dispersed in a matrix of ferrite. A small amount of martensite may form from some of the austenite islands when cooled, particularly to the low temperatures contemplated herein, but substantially all the martensite formed after the prenormalizing and/or normalizing treatment is no longer present in that form.

Any other method of obtaining final structures of the same nature as obtained by the foregoing reheating treatment may also be used. Thus, after the treatment at normalizing temperatures, the steel may be transformed substantially isothermally within the same range of reheating temperatures as given hereinbefore and then cooled, followed by the reheating treatment of the invention. As an example, a steel (No. 17) containing about 8.85% nickel, 0.08% carbon and the balance substantially all iron, except for incidental small amounts of manganese, silicon, sulfur, etc., had impact notch strengths of 40 foot-pounds at minus 320° F. and 58 foot-pounds at room temperature when prenormalized at about 1650° F., air cooled, treated at about 1450° F., quenched in a molten salt bath to about 1050° F. and isothermally transformed at that temperature for ten hours, and then air cooled and reheated to 1050° F. While equal or even better low temperature properties are obtained by such a method of treating, it may not be as practical on a commercial scale for certain applications as continuous cooling to room temperature, after treatment at normalizing temperatures, to obtain the required carbide dispersion and then reheating to form a small amount of stable austenite in a ferrite matrix.

After reheating, the steel may be given a further treatment at any temperature below the zone CDEF or may be given a second reheating treatment, care being taken not to employ temperatures exceeding the zone CDEF by more than about 25° F. Thus, an 8½% nickel steel may be heated at temperatures within the range of 400° F. to 1100° F., e. g., 900° F. to 950° F., to improve further the impact strength as indicated by the upper curve of Fig. 7.

Figure 6:
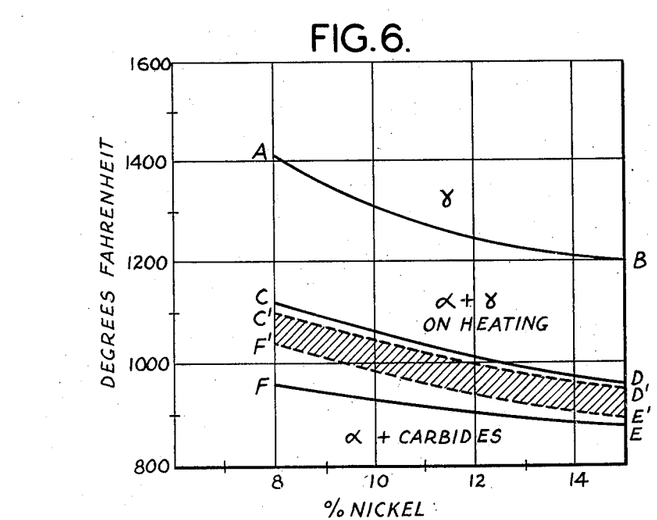
Fig. 6 is a chart showing by the reference line AB the temperatures which should be exceeded for various nickel contents in carrying out a normalizing operation in a heat treatment employed by the invention and showing by the zones CDEF and C'D'E'F' the temperatures employed for various nickel contents in carrying out a reheating operation in a heat treatment employed by the invention.

As shown in Fig. 6, the temperatures employed in prenormalizing and normalizing above the line AB and the temperatures employed in the subsequent reheating treatment in or near the zone CDEF are related to the nickel content in such a manner that the treating above the line AB is conducted at temperatures where substantially the entire structure will transform in a reasonable time to an austenite which is relatively unstable at room temperature and the reheating is conducted at temperatures in or near the zone CDEF so that a portion of the structure transforms to a small amount of stable austenite of approximately eutectoid composition. The line AB and the zones CDEF and C'D'E'F' can be defined by the following relation between nickel content and temperature:

| Per Cent Nickel | AB | CDEF | C'D'E'F' |
|---|---|---|---|
| | ° F. | ° F. | ° F. |
| 8 | 1,410 | 960 to 1,120 | 1,040 to 1,100 |
| 8.5 | 1,380 | 950 to 1,100 | 1,020 to 1,080 |
| 10 | 1,310 | 925 to 1,060 | 980 to 1,040 |
| 11 | 1,270 | 910 to 1,030 | 955 to 1,015 |
| 13 | 1,225 | 890 to 990 | 920 to 980 |
| 15 | 1,200 | 875 to 960 | 890 to 950 |

The nickel steels contemplated by the invention have Charpy impact strengths at minus 320° F. in excess of the 15 foot-pounds required by specifications such as the Boiler Construction Code in the normalized or prenormalized and normalized conditions, but it is by far preferred that the steels be subsequently reheated in the manner described as this reheating treatment imparts exceptionally high properties to the steels of the invention. Acceptable but slightly lower Charpy impact strengths can be obtained by employing either the normalizing or the prenormalizing treatment and omitting the other. Thus, an 8.6% nickel steel (Steel No. 16 given hereinafter) treated at 1800° F. and reheated at 1100° F. for two hours had a Charpy impact strength at minus 320° F. of 20 foot-pounds, and when the reheating was extended to twelve hours, the impact strength was 25 foot-pounds at the same low temperature. In hot wrought steels, some prenormalizing and/or normalizing treatment may be obtained from the residual heat of hot working so that the steel need be given only the reheating treatment, but such a method of treating is not preferred. In general, it can be stated that when properly treated, the steel contemplated by the invention and articles made thereof will exhibit a keyhole notch Charpy impact strength consistently in excess of about 20 foot-pounds at temperatures down to at least minus 320° F.

The aim of the heat treatment is to obtain by the sequence of treatments a uniform distribution of stable austenite in a ferrite matrix after the reheating treatment. Very good uniformity of distribution is obtained by quenching to room temperature from temperatures above the line AB and then reheating in the manner described hereinbefore. Almost equally good uniformity of distribution is obtained by quenching from above the line AB in a bath held at the reheating temperature and treating at that temperature followed by reheating. Satisfactory uniformity of distribution results from air cooling sections up to about two inches to room temperature from temperatures above the line AB and then employing the reheating treatment of the invention. Slow cooling to room temperature from above the line AB, e. g., furnace cooling, followed by the reheating treatment produces acceptable properties but is not as desirable and results in some segregation in distribution. The distribution of stable austenite depends upon the distribution of carbon existing after cooling from above the line AB. The effect of the distribution of austenite in the ferrite matrix obtained by these various embodiments of the heat treatment is reflected by the impact strength at minus 320° F., as illustrated by the following data obtained on steels contemplated by the invention and containing about 8.5% to 8.9% nickel:

| Steel No. | Treatment, ° F. | Charpy Impact | |
|---|---|---|---|
| | | Room | −320 |
| 15 | Quenched from 1450 to room temperature, reheated 1050. | 53.5 | 43 |
| 17 | Quenched from 1450 to 1050, treated at 1050, air cooled, reheated 1050. | 58 | 40 |
| 17 | Normalized 1450 (air cooled), reheated 1050. | 60 | 35 |
| 17 | Furnace cooled slowly from 1450 to room temperature, reheated 1050. | 50 | 25 |

Figure 7:
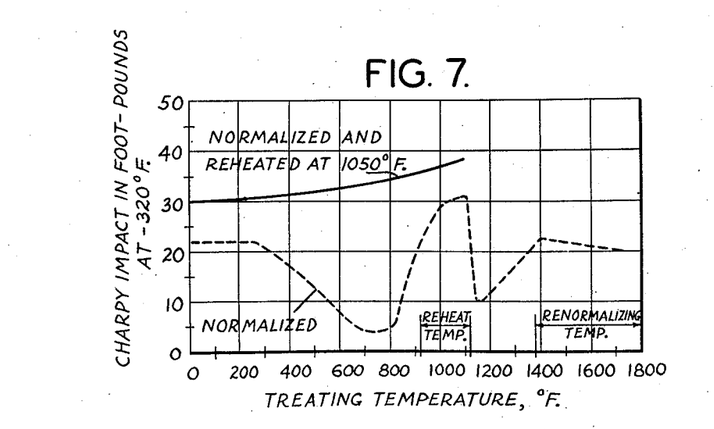
Fig. 7 is a graph illustrating the marked beneficial effect obtained by the invention when a steel, containing about 8.5% nickel, after being normalized is reheated at temperatures in and near the temperatures of the zones CDEF and C'D'E'F' of Fig. 6 in comparison to the detrimental effect of treating a normalized steel at lower temperatures and also illustrating that when the reheating treatment is employed, a subsequent heat treatment at lower temperatures is no longer detrimental upon the impact resistance.

Fig. 7 illustrates by the two curves some of the advantages of employing the reheating treatment contemplated by the invention and some of the precautions to be taken if the steels contemplated by the invention are used in the much less preferred "as normalized" condition. The lower curve of Fig. 7 shows the effect on the low temperature impact strength of ferritic steels contemplated by the invention and containing about 8.5% nickel which have previously been prenormalized and normalized (indicated on the curve by the term "normalized") of thereafter treating the normalized steel at the temperatures indicated on the graph. This lower curve illustrates the critical range of treating temperatures where improved impact strength is obtained by the reheating treatment of the invention described hereinbefore. With treating temperatures above and below this range of reheating temperatures, indicated by the sharp peak in the curve, the impact strength at low temperatures is markedly decreased to a value below the value required by the codes and specifications, and even as low as about 3 to 4 foot-pounds, when tested at minus 320° F. When the treating temperatures are increased above the line AB of Fig. 6, then the effect is one of renormalizing and substantially the same properties are obtained as after normalizing. From the lower curve of Fig. 7, it will be appreciated that if after being normalized the steel or article made thereof should be subjected to temperatures below the reheating temperatures contemplated by the invention or above said reheating temperatures but below the line AB of Fig. 6, i. e., below the normalizing temperatures, the steel or article would exhibit low impact strength. On occasion, it may be necessary to cool the steel slowly from above the upper critical (Ac₃) temperature, i. e., from normalizing temperatures, as in annealing, or to heat the steel again, as in welding, etc., to an unfavorable temperature below or above the reheating temperatures contemplated herein, in which conditions, the low temperature properties would be low. If so, satisfactory low temperature impact properties are imparted by thereafter subjecting the steel to the reheating treatment of the invention. Of course, the steel can also be renormalized, preferably followed by the reheating treatment. On the other hand, if the steel is given the reheating treatment of the invention prior to being heated at unfavorable lower temperatures, satisfactory low temperature properties will be retained, as pointed out more fully hereinafter. Our investigations have also shown that extended or multiple treatments at temperatures below the reheating temperatures of the invention will not restore or impart the high impact properties at very low temperatures obtained by the reheating treatments of the invention.

The upper curve of Fig. 7 illustrates the advantages of the preferred treatment involving a reheating treatment after the normalizing treatment and shows the effect of treatment at various temperatures on the impact properties at minus 320° F. of ferritic steels containing about 8.5% nickel which have previously been placed in a normalized and reheated condition (reheated at 1050° F.). The impact properties are generally raised at all temperatures up to and including the reheating temperatures of the invention. Thus, after the preferred normalizing and reheating treatment, further treatments at temperatures up to and including the reheating temperatures are, in general, beneficial. The upper curve of Fig. 7 also illustrates that the preferred treatment eliminates the effect of certain temperatures (below the reheating temperatures) which produce low impact properties in steels in the normalized condition, as illustrated by the valley between about 300° F. and 900° F. in the lower curve of Fig. 7 and the absence of this valley in the upper curve. A steel having a composition within the ranges contemplated by the invention can, after having been given the reheating treatment of the invention, be subjected subsequently to lower temperatures, as in areas adjacent a weld or as a result of any other low temperature heating, without exhibiting the lowered impact strength exhibited by the normalized steels.

The foregoing influence of various treatments and temperatures upon the impact properties are illustrated by the following data showing the Charpy keyhole notch impact strength in foot-pounds at room temperature and at minus 320° F. obtained upon ferritic steels containing about 8.6% nickel, about 0.10% carbon, about 0.8% manganese, about 0.23% silicon and the balance substantially all iron except for small amounts of impurities and special treating agents such as sulfur, phosphorus, aluminum, titanium, etc.:

| Treatment, ° F. | Charpy Impact | |
|---|---|---|
| | Room | −320 |
| Normalized 1450; treated 600 | 35 | 7.5 |
| Normalized 1450; treated 800 | 33 | 6 |
| Normalized 1450; reheated 950 | | 25 |
| Normalized 1450; reheated 1000 | 52 | 27 |
| Normalized 1450; reheated 1050 | 50 | 28 |
| Normalized 1450; reheated 1100 | 55 | 30 |
| Normalized 1450; treated 1150 | 57 | 10 |
| Normalized 1450; treated 1200 | 35 | 14 |
| Quenched from 1450; treated 600 | 28 | 10 |
| Quenched from 1450; treated 800 | 35 | 3 |
| Quenched from 1450; reheated 1050 | 52 | 34.5 |
| Normalized 1450; treated 600; treated 600 | | 3 |
| Normalized 1450; treated 850; treated 850 | | 10 |
| Normalized 1450; treated 800; reheated 1050 | | 37 |
| Normalized 1450; reheated 1050; treated 600 | 58 | 36 |
| Normalized 1450; reheated 1050; treated 800 | 73 | 39 |
| Normalized 1450; reheated 1050; reheated 1000 | 68 | 39 |
| Normalized 1450; reheated 1050; reheated 1050 | 71 | 42 |
| Normalized 1450; reheated 950; reheated 950 | | 22 |
| Normalized 1450; treated −320; reheated 950 | | 21 |

As indicated hereinbefore, the steels contemplated by the present invention are characterized in the "as normalized" condition, i. e., after being cooled from normalizing temperatures to room temperature at a rate at least as fast as air cooling, in sections up to about two inches by a martensitic structure which contains some ferrite and which may also contain a small amount of retained austenite due to the fact that the transformation from austenite (formed at the normalizing temperatures) to martensite may not be 100% complete at the temperature to which the normalized steel is cooled from the normalizing temperatures. This retained austenite is relatively unstable. After the subsequent reheating treatment, the modified normalized structure is comprised predominantly of a ferrite matrix in which are dispersed small areas or islands of austenite of approximately eutectoid carbon content and having a relatively high degree of stability at low temperatures. When the normalized steel is reheated, after being cooled to room temperature, the steel is tempered as it is being heated through temperatures below the reheating temperatures. Such a tempering produces low properties if the steel were used in this condition. In tempering, small particles or spheroids of carbides are formed, and upon reaching the reheating temperatures, these carbides apparently dissolve to reform carbon-rich austenite, in the shape of small islands, having approximately eutectoid carbon content and having relatively high stability when subsequently cooled to room temperature and to the low service temperatures contemplated by the invention. Some martensite may form from this austenite, but the amount is small. The relative proportions of austenite and martensite may be influenced by many factors, the more important of which are the nickel content, the time and temperature of the reheating treatment, whether the steel was cooled to room temperature from the normalizing temperature and then heated or was cooled directly from the normalizing temperature to the reheating temperature as in isothermal transformations, the rate of cooling from normalizing temperatures, etc. A small amount of residual tempered martensite may be present in the final structure after the reheating treatment and may vary from fine spheroids such as in sorbite to a coarse type such as occurs in conventionally spheroidized steels. Illustrative examples of the structure in the "as normalized" and "as normalized and reheated" conditions for steels of various indicated nickel contents are shown in Figs. 15 to 22.

Figure 11:
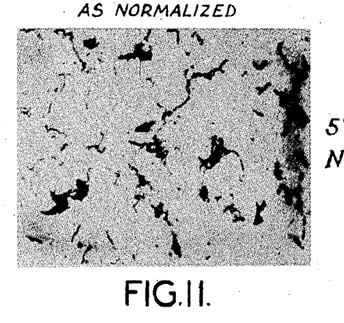
Figs. 11 and 12 are reproductions of a pair of photomicrographs taken at 1000 magnifications showing the structure in the "as normalized" and "as normalized and reheated" conditions, respectively, of a 5% ferritic nickel steel.
Figure 12:
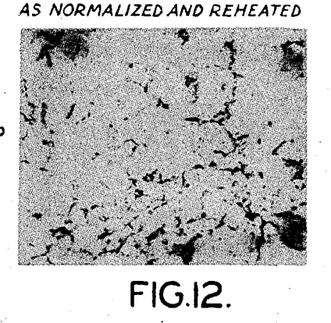
Figure 13:
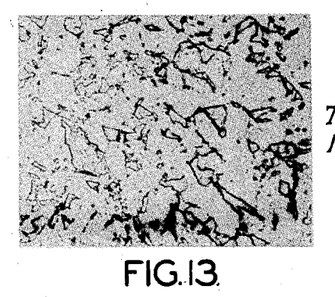
Figs. 13 and 14, 15 and 16, 17 and 18, 19 and 20, and 21 and 22 are reproductions of similar pairs of photomicrographs taken at the same magnification and showing the microstructure of ferritic nickel alloy steels in the "as normalized" and "as normalized and reheated" conditions, respectively, and containing about 7%, 8.5%, 10%, 11% and 15% nickel, respectively.
Figure 14:
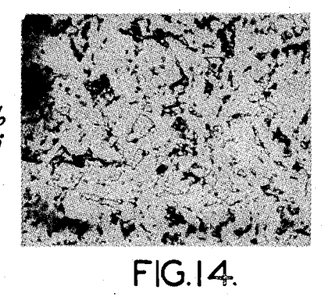

In their martensitic microstructure after normalizing and before the reheating treatment, the steels of the present invention are distinguished from the lower nickel steels, such as those containing 3.5% and 5% nickel, which in the normalized condition has a pearlitic microstructure, i. e., pearlite areas in a ferritic matrix. This is illustrated in Fig. 11 wherein the dark areas or islands are pearlite in a light ferrite matrix. We have found that by increasing the uniformity of carbon distribution that exists in the steel when in the "as normalized" condition, whatever the means employed to accomplish this, e. g., increasing the cooling rate from normalizing temperatures as by quenching in oil or the like, increasing the nickel content, or otherwise changing the composition, etc., the low temperature impact properties of the steels are improved after the subsequent preferred reheating operation is employed. The improvement in low temperature impact strength with increasing carbon distribution is illustrated by the steels of Figs. 13, 15, 17, 19 and 21. The Charpy keyhole notch impact strength of the steels at minus 320° F. when subsequently subjected to the reheating treatment of the invention to obtain the structure of Figs. 14, 16, 18, 20 and 22 were about 19, 30, 34, 37.5 and 30 foot-pounds, respectively.

As a satisfactory and advantageous specific example of alloy steels coming within the broader purview of the invention, we have employed compositions containing about 8% to 10% nickel. The impact resistances and percentage loss of impact resistance in dropping from room temperature to minus 320° F. of such steels are diagrammatically included in Fig. 2 and Fig. 3, respectively, of the drawings. The impact resistance at various temperatures from plus 70° F. to minus 320° F. for a steel within this range and containing about 8.5% nickel is shown in Fig. 1. An illustrative example of steel compositions within said range is as follows:

Carbon ___________________ per cent max.___ 0.12
Nickel ___________________ per cent__ 8.4 to 9
Manganese _______________ do____ 0.3 to 0.7
Silicon __________________ do____ 0.1 to 0.3
Phosphorus ______ per cent max. up to 0.025
Sulfur ___________________ do____ up to 0.025

Figure 15:
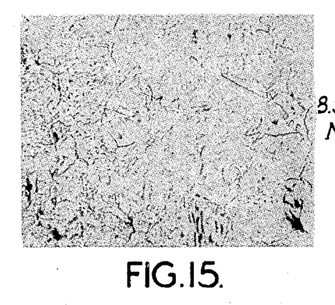
Figure 16:
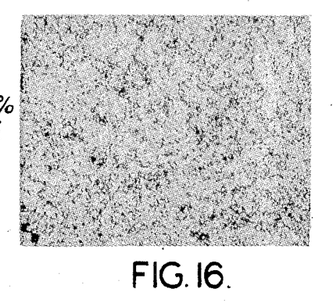
Figure 17:
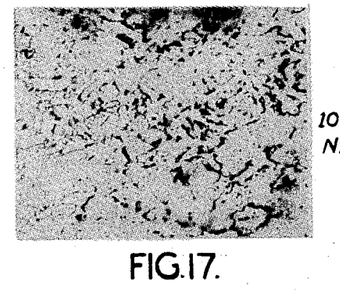
Figure 18:
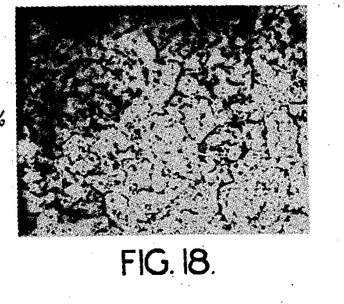
Figure 19:
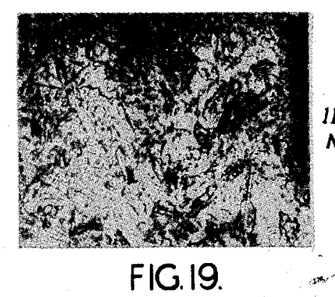
Figure 20:
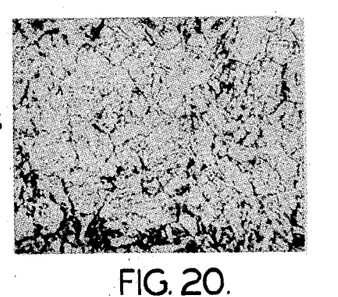
Figure 21:
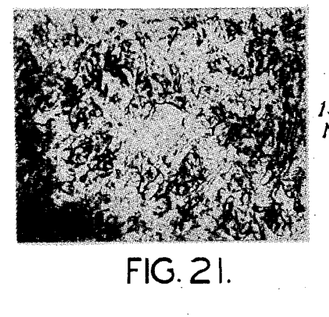
Figure 22:
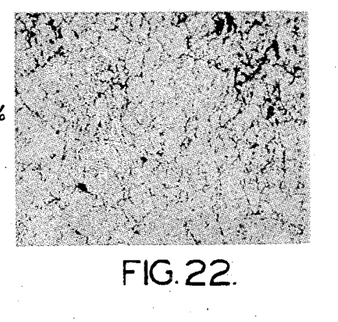

Optionally, the compositions may be treated by adding aluminum or titanium or both, for example, adding up to 0.1% aluminum and up to 0.1% titanium to the molten steel. Steels containing about 8% to 10% nickel when properly heat treated, as by air cooling sections up to about two inches thick or liquid quenching larger sections from above their upper thermal critical range (line AB of Fig. 6), are characterized, in general, by a structure comprised predominantly of martensite and containing ferrite plus some austenite, and, after suitable reheating as described herein, are comprised predominantly of a ferritic matrix containing islands of stable austenite and perhaps some tempered martensite. Such structures are illustrated in Figs. 15 and 16.

Included within the overall range of nickel content contemplated in the broader aspect of the invention, there exist steels containing preferred nickel contents exceeding 10% and up to 15%, preferably within the range of about 11% to 13% nickel, with the usual amounts of incidental elements and impurities, e. g., as indicated in the preceding paragraph. The steels containing over 10% nickel possess not only materially enhanced impact strength but also other important advantages and properties, as compared to the steels having nickel contents within the range of 8% to 10%, including the following:

1. Higher notch impact strengths at low temperatures, even at lower temperatures than minus 320° F.

2. An approach to non-variant toughness over the temperature range from 70° F. to minus 320° F. and even lower.

3. Material reduction of the importance of strain aging embrittlement.

4. Reduction of "mass effect" in heat treatment permitting air cooling of larger sections to obtain the desired high impact strength.

As illustrative examples thereof, reference is made to ferritic steels having nickel contents of 10.05%, 11%, 11.24%, 12.92%, 13.0% and 15.0%, respectively, the analyses of which are given hereinafter in Table A, the balance of the composition being substantially all iron.

The Charpy keyhole notch test results of the 10.05% and the 12.92% nickel steels after prenormalizing and normalizing are included in the chart of Fig. 1. Fig. 1 indicates that the 10.05% nickel steel shows a very substantially reduced sensitivity to temperature compared to the lower nickel content steels and with the substantial notch impact strength at minus 320° F. of 24.5 foot-pounds. After reheating, the low temperature notch impacts strength at said temperature is increased to exceed 30 foot-pounds, as shown in Fig. 2. In similar manner, the test results of the 11%, the 11.24% and particularly the 12.92%, 13.0% and 15.0% nickel steels show that these steels have even further approach to uniformity for extended temperature ranges. The impact resistances of these steels after a prenormalizing and normalizing treatment and after a subsequent reheating treatment are given hereinafter and are illustrated in Fig. 1 and/or Fig. 2.

Figure 3:
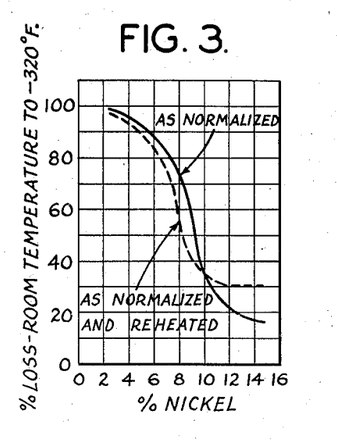
Fig. 3 shows the influence of nickel in ferritic steels on the per cent loss of notch impact resistance in dropping from plus 70° F. to minus 320° F. and illustrates the much smaller loss which characterizes the alloy steels of the present invention.

The influence of nickel content upon the temperature sensitivity of the notch impact resistance of the steels contemplated by the present invention, including the steels containing 10.05%, 11%, 11.24%, 12.92%, 13.0% and 15.0% nickel, and upon the temperature sensitivity of the notch impact resistance of steels with lower nickel contents than 8% is shown in Fig. 3 wherein the sensitivity is expressed as the per cent of room temperature impact strength lost in dropping the temperature to minus 320° F.

As is illustrated by the comparative chart of Fig. 1, the alloy steels within the scope of the invention are characterized by adequate notch impact strength within the upper bracket of the frigid range of say down to minus 120° F. with retained high impact strength therebelow through the lower temperature range. This, as will be noted, is very pronounced in comparison with the ferritic alloys of lower nickel content which while having specially high impact resistance values in the upper temperature range show a pronounced and steep drop from about minus 120° F., crossing the line of the steel contemplated by the invention at about minus 240° F. or above and progressing to a very marked deficiency of notch impact strength in the lower temperature range of about minus 260° F. to minus 290° F. and thereabouts where the impact strength falls below about 15 foot-pounds. At lower temperatures, the impact strength is only of the order of 3 to 10 foot-pounds. The marked retention of impact strength over a wide variation in the temperature which characterizes the steels of the present invention as compared to the great loss in impact strength of steels containing smaller amounts of nickel is brought out in Fig. 3. In the figure, the percentage of nickel in the steel, in the normalized condition and in the normalized and reheated condition, has been plotted against the percentage loss in the impact strength in dropping from plus 70° F. to minus 320° F. When the nickel content is below about 8%, normalized and reheated steels exhibit a high loss of at least about 60% compared to the impact strength possessed by the same steel at plus 70° F. At about 8%, the loss in impact strength over the same range of temperatures falls very markedly with increasing nickel content until the nickel content is increased above 10% whereupon the loss in impact strength becomes substantially constant with a loss of only about 30% as compared to the impact strength at plus 70° F. The curve for the various steels in the normalized condition is similar except that the loss in impact strength of the steels is more pronounced until the nickel content exceeds 10% whereupon the steels exhibit less loss in impact than those in the normalized and reheated condition. As will be further noted from Fig. 1, the steels containing at least 8% nickel contemplated by the invention, and particularly the steels containing over 10% nickel, are distinguished from steels having lower nickel contents than 8% in that they have no range of rapid embrittlement within the practical service temperature ranges and show a steady but slight decrease in notch impact strength proportionate to the temperature drop with decreasing temperature to at least about minus 320° F.

Figure 8:
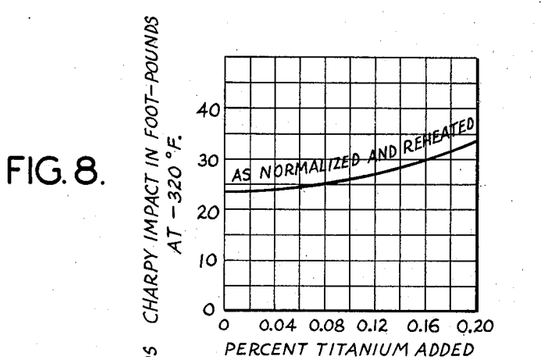
Fig. 8 depicts a curve showing the effect of various small amounts of titanium additions upon the Charpy keyhole notch impact resistance at minus 320° F. of 8.5% nickel ferritic steels in the "as normalized and reheated" condition.
Figure 9:
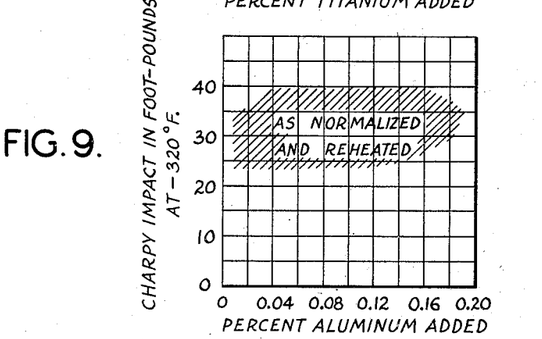
Fig. 9 depicts a similar curve showing the effect of various aluminum additions on similar 8.5% nickel steels in the same condition and at the same temperature.
Figure 10:
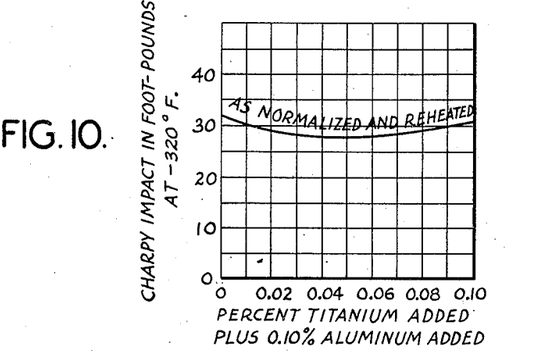
Fig. 10 is a similar chart depicting the effect of adding about 0.1% aluminum plus various amounts of titanium on the impact resistance at minus 320° F. of 8.5% nickel steels in the same condition.

It has been found that in the preparation of the given steels the impact strength is beneficially increased by the employment of aluminum or of titanium as a treating agent added shortly before casting and that substantial further benefit is obtained by the employment of a combination of both, which is recommended to be of from about 0.05% to 0.10% titanium with about 0.05% to 0.10% of aluminum, as indicated in Figs. 8, 9 and 10. Titanium has been found, for instance, to increase the soundness and forgeability of the steel to a desired degree. Illustrative comparative data relating to additions of treating agents are set forth in the following table which also indicates that further increased values are obtained by a treatment including the steps of treating at normalizing temperatures, then quenching in oil instead of air cooling and then reheating. Oil quenching from the normalizing temperature has a marked beneficial effect where production conditions permit its use. These following results are based on similar nickel steel alloys containing approximately 8.25% to 8.6% nickel after various additions of calcium (added as calcium silicide containing 32% calcium), aluminum, titanium (added as ferro-titanium having the composition given hereinafter in the footnote to Table A), and combined additions of aluminum and titanium, and in the normalized (N), the normalized and reheated (NR), and the treated at normalizing temperatures, quenched in oil from the normalizing temperature and reheated (NQR) conditions.

| Treating Agent | Condition | Charpy Impact (Keyhole) | |
|---|---|---|---|
| | | Room | −320° F. |
| 0.10% Ca | NR | 46 | 23.5 |
| 0.03% Al | NR | 59 | 39 |
| 0.10% Al | N | 44.5 | 20.5 |
| 0.10% Al | NR | | 23.5 |
| 0.10% Al | NQR | 53.5 | 42.5 |
| 0.15% Al | NR | 56.5 | 39.5 |
| 0.20% Al | NR | 59 | 36 |
| 0.05% Ti | N | 31.5 | 21 |
| 0.05% Ti | NR | 51 | 25.5 |
| 0.10% Ti | NR | 56 | 25.5 |
| 0.20% Ti | NR | 63 | 34 |
| 0.10% Al+0.05% Ti | NR | 53.5 | 28 |
| 0.10% Al+0.10% Ti | NR | 62.5 | 30.5 |

The effect on impact strength at minus 320° F. of various added amounts of titanium, of aluminum and of about 0.1% aluminum plus various amounts of titanium employed in treating nickel steels containing about 8.25% to 8.5% nickel are illustrated in Figs. 8, 9 and 10, respectively. In the normalized and reheated condition, the impact values at minus 320° F. of the steels treated with aluminum only (Fig. 9) are scattered and may vary considerably but at high values between about 23 and 40 foot-pounds, with a normal expectancy of about 30 foot-pounds. As illustrated in Figs. 8 and 10, this variation is reduced by using titanium alone or aluminum plus titanium, thereby enabling more accurate prediction of the impact strength. Employment of both aluminum and titanium as a treating agent generally results in a slightly higher notch impact resistance value than that of steels in the normalized and reheated condition which had been treated with titanium alone. The high values are obtained more consistently with the combination treatment of aluminum plus titanium, although treatment with aluminum alone is satisfactory generally.

In order that those skilled in the art may have a better understanding of the invention, the following tables are included giving representative data on alloy steels of varied nickel content and subjected to varied heat treatments, and set forth comparative information obtained demonstrating some of the advantages of the invention:

*Table A*

| Steel No. | Composition | | | | Additions (Per Cent Added) | | Treating Temperatures | |
|---|---|---|---|---|---|---|---|---|
| | Per Cent Ni | Per Cent C | Per Cent Mn | Per Cent Si | Al | Ti [3] | Normalize, °F.[1] | Reheat, °F. |
| 1 | 2.85 | 0.03 | 0.34 | 0.15 | 0.10 | | [2] 1,575 | 1,275 |
| 2 | 3.77 | 0.09 | 0.36 | 0.13 | 0.10 | | 1,550 | 1,250 |
| 3 | 4.74 | 0.03 | 0.31 | 0.12 | 0.10 | | 1,500 | 1,175 |
| 4 | 5.00 | 0.09 | 0.37 | 0.13 | 0.10 | | 1,550 | 1,200 |
| 5 | 7.01 | 0.08 | 0.50 | 0.17 | 0.10 | | 1,500 | 1,100 |
| 6 | 7.42 | 0.10 | 0.48 | 0.19 | 0.10 | | 1,475 | 1,075 |
| 7 | 7.93 | 0.09 | 0.35 | 0.13 | 0.10 | | 1,475 | 1,075 |
| 8 | 8.12 | 0.09 | 0.53 | 0.21 | 0.10 | 0.05 | 1,450 | 1,050 |
| 9 | 8.36 | 0.09 | 0.53 | 0.22 | | 0.05 | 1,450 | 1,050 |
| 10 | 8.36 | 0.08 | 0.51 | 0.21 | 0.10 | 0.10 | 1,450 | 1,050 |
| 11 | 8.39 | 0.20 | 0.48 | 0.17 | 0.10 | | 1,425 | 1,050 |
| 12 | 8.4 | 0.15 | 0.53 | 0.19 | 0.10 | | 1,450 | 1,050 |
| 13 | 8.44 | 0.08 | 0.52 | 0.21 | 0.10 | | 1,450 | 1,050 |
| 14 | 8.5 | 0.06 | 0.50 | 0.20 | 0.10 | | 1,450 | 1,050 |
| 15 | 8.5 | 0.09 | 0.49 | 0.15 | 0.10 | | 1,450 | 1,050 |
| 16 | 8.6 | 0.10 | 0.77 | 0.23 | 0.05 | 0.05 | 1,450 | 1,050 |
| 17 | 8.85 | 0.08 | 0.47 | 0.15 | 0.10 | | 1,450 | 1,050 |
| 18 | 8.9 | 0.03 | 0.52 | 0.21 | 0.10 | | 1,450 | 1,050 |
| 19 | 10.0 | 0.09 | 0.58 | 0.21 | 0.10 | | 1,400 | 975 |
| 20 | 10.05 | 0.10 | 0.38 | 0.12 | 0.10 | | 1,400 | 975 |
| 21 | 11.0 | 0.10 | 0.50 | 0.20 | 0.10 | | 1,450 | 1,050 |
| 22 | 11.24 | 0.09 | 0.31 | 0.12 | 0.10 | | 1,350 | 925 |
| 23 | 12.92 | 0.08 | 0.44 | 0.17 | 0.10 | | 1,350 | 925 |
| 24 | 13.0 | 0.10 | 0.50 | 0.25 | 0.10 | | 1,450 | 925 |
| 25 | 15.0 | 0.10 | 0.50 | 0.20 | 0.10 | | 1,350 | 925 |

[1] Prenormalized at 1650° F. for 1 hour and then air cooled prior to normalizing at indicated temperature for about 1 hour.
[2] Prenormalized at 1700° F. for 1 hour instead of at 1650° F.
[3] Added as ferro-alloy containing about 40% titanium, 9% aluminum and 3.5% silicon.

*Table B*

| Steel No. | Per cent Nickel | Condition [1] | BHN [6] | Charpy Impact [2] | |
|---|---|---|---|---|---|
| | | | | Room | −320° F. |
| 1 | 2.85 | N[5] | 108 | 75 | 2.5 |
| | | NR[5] | 107 | 80.5 | 3 |
| | | NQR[4] | 116 | 84 | 4 |
| 2 | 3.77 | N | 133 | 57.5 | 3 |
| | | NR | 124 | 61 | 3 |
| 3 | 4.74 | N | 120 | 77 | 8 |
| | | NR | 114 | 81 | 4 |
| 4 | 5.00 | N | 147 | 55.5 | 5.5 |
| | | NR | 138 | 60 | 6 |
| 5 | 7.01 | N | 191 | 52.5 | 9 |
| | | NR | 172 | | 19 |
| 6 | 7.42 | N | 195 | 51.5 | 11 |
| | | NR | 187 | 49.5 | 15.5 |
| 7 | 7.93 | N | 173 | 52 | 23.5 |
| | | NR | 167 | 52 | 25 |
| | | NRF | 164 | | 32 |
| | | NS | 164 | 53 | 26 |
| 8 | 8.12 | NR | 236 | 53.5 | 28 |
| 9 | 8.36 | N | 323 | 31.5 | 21 |
| | | NR | 205 | 51 | 25.5 |
| 10 | 8.36 | NR | 226 | 62.5 | 30.5 |
| 11 | 8.39 | NS | 247 | 45 | 26 |
| 12 | 8.4 | NS | 228 | 51.5 | 32.5 |
| 13 | 8.44 | NR | 208 | | 36.5 |
| | | NRF | 214 | | 30.5 |
| | | NS | 255 | | 31.5 |
| | | NSF | 212 | | 35.5 |
| 14 | 8.5 | N | 199 | 52 | 29.5 |
| | | NR | 189 | 62.5 | 31 |
| 15 | 8.5 | N | 224 | 44.5 | 20.5 |
| | | NR | 204 | | 28.5 |
| | | NS | 196 | 54 | 27.5 |
| | | NQ[3] | 368 | | 19.5 |
| | | NQR[4] | 227 | 53.5 | 43 |
| 16 | 8.6 | NT(800) | 285 | 33 | 6 |
| | | NQT(800) | 289 | 35 | 3 |
| | | NT(800)R | 235 | | 37 |
| | | NRT(800) | 235 | 73 | 39 |
| | | NT(600) | 331 | 35 | 7.5 |
| | | NQT(600) | 342 | 28 | 10 |
| | | NT(600)T(600) | 306 | | 3 |
| | | NRT(600) | 235 | 58 | 36 |
| | | NQR | 228 | 52 | 34.5 |
| | | NRR | 241 | 71 | 42 |
| 17 | 8.85 | NA | 219 | 31 | 5 |
| | | NAR | 200 | 50 | 25 |
| | | NR | 206 | 60 | 36 |
| 18 | 8.9 | N | 213 | 58 | 32 |
| | | NR | 179 | 70 | 44 |
| | | NQR | 196 | 67 | 49 |
| 19 | 10.0 | N | 361 | 26 | 25 |
| | | NR | 249 | 45 | 29 |
| 20 | 10.05 | N | 300 | 36 | 24.5 |
| | | NR | 227 | | 34 |
| 21 | 11.0 | NR | 239 | 51.5 | 38 |
| 22 | 11.24 | NR | 259 | 45.5 | 32 |
| | | NRF | 234 | | 37.5 |
| 23 | 12.92 | N | 353 | 35 | 30 |
| | | NR | 273 | 44.5 | 31 |
| | | NRRF | 266 | | 35 |
| | | NS | 268 | 47 | 32 |
| 24 | 13.0 | NR | 262 | | 35.5 |
| 25 | 15.0 | N | 371 | 31 | 21 |
| | | NR | 245 | 43 | 30 |

[1] N=Prenormalized at 1650° F. for 1 hour, air cooled and then normalized; R=Reheated 1 to 2 hours and air cooled unless otherwise indicated; S=Reheated 5 hours and air cooled unless otherwise indicated; Q=Quenched from normalizing temperature; A=Slowly cooled in furnace from normalizing temperature; F=Furnace cooled from reheat temperature; T=Treated at indicated temperature (°F.) for 1 to 2 hours and air cooled.
[2] Keyhole notch impact in foot-pounds; duplicate or triplicate test averages.
[3] Water quenched from 1550° F. normalizing temperature.
[4] Oil quenched from 1350° F. normalizing temperature.
[5] Prenormalized at 1700° F. for 1 hour instead of at 1650° F.
[6] Brinell hardness number at room temperature.

The data of Table B illustrate the very substantial improvement in the impact resistance values at the low temperature of minus 320° F. exhibited by Steels Nos. 7 to 25 over the steels of lower nickel content numbered 1 to 6, inclusive.

Data illustrating the range of reheating temperatures which can be employed in accordance with the invention for steels containing over 10% and up to 15% nickel are given in the following table:

Table C

| Steel No. | Nickel, Per Cent | Treatment, °F. | | | Charpy Impact at −320 ft.-lbs. |
|---|---|---|---|---|---|
| | | Pre-norm. | Normal. | Reheat | |
| 20 | 10.05 | 1,650 | 1,400 | 975 | 34 |
| 20 | 10.05 | 1,650 | 1,450 | 990 | 44.5 |
| 20 | 10.05 | 1,650 | 1,450 | 1,015 | 42 |
| 20 | 10.05 | 1,650 | 1,450 | 1,035 | 40 |
| 22 | 11.24 | 1,650 | 1,350 | 925 | 32 |
| 21 | 11.0 | 1,650 | 1,450 | 985 | 38 |
| 21 | 11.0 | 1,650 | 1,450 | 1,010 | 37.5 |
| 21 | 11.0 | 1,650 | 1,450 | 1,050 | 38 |
| 23 | 12.92 | 1,650 | 1,350 | 925 | 31 |
| 24 | 13.0 | 1,650 | 1,450 | 925 | 35.5 |
| 24 | 13.0 | 1,650 | 1,450 | 975 | 37.5 |
| 24 | 13.0 | 1,650 | 1,450 | 1,000 | 40.5 |
| 25 | 15.0 | 1,650 | 1,350 | 925 | 30 |
| 25 | 15.0 | 1,650 | 1,450 | 885 | 36 |
| 25 | 15.0 | 1,650 | 1,450 | 910 | 37 |
| 25 | 15.0 | 1,650 | 1,450 | 935 | 36 |
| 25 | 15.0 | 1,650 | 1,450 | 950 | 30 |

The following table gives illustrative data showing the high room temperature mechanical properties possessed by normalized and reheated wrought steels employed in the present invention.

Table D

| Per Cent Ni | Tensile Strength | Yield Point | Proportional Limit | Elongation, Per Cent | Reduction in Area, Per Cent | BHN |
|---|---|---|---|---|---|---|
| 8.6 | 115,000 | 104,000 | 94,000 | 26 | 65 | 247 |
| 11.0 | 112,000 | 100,000 | 87,000 | 27 | 63 | 242 |
| 13.0 | 119,000 | 108,000 | 94,000 | 25 | 66 | 259 |
| 15.0 | 124,000 | 117,000 | 101,000 | 24 | 66 | 273 |

The steels described herein successfully meet the engineering requirements of a moderately priced material which is readily weldable with suitable electrodes such as any of the austenitic alloys to obtain welds highly resistant to low temperature embrittlement after stress relieving annealing. The ferritic structure material of the invention possesses a Charpy impact resistance more than sufficient to meet the requirements of most specifications such as set forth in the American Society of Mechanical Engineers' Boiler Construction Code throughout the frigid temperature range given hereinbefore, particularly when the ferritic structure material has been given a normalizing and reheating heat treatment. The steels contemplated by the invention in the normalized and reheated condition retain their high impact strength when exposed for long periods of time to the low service temperatures with which the invention is concerned. For example, no change in impact strength was observed after 12 months' exposure at minus 320° F. Likewise, no change in impact strength took place when normalized and reheated steels contemplated by the invention were subjected to repeated cooling to minus 320° F. from room temperature.

The present invention contemplates articles, including structural elements, subjected in use to load at low temperatures, particularly below minus 240° F., and especially below minus 260° F. and down to minus 320° F. and lower, made of the nickel steels described herein. Illustrative examples of such articles include tanks, containers, reservoirs, vessels, heat exchangers, and the like for producing, processing, storing and/or distributing liquefied gas, and associated equipment such as valves, pumps, piping, tubes, conduits, etc. The invention is particularly applicable for vessels containing under pressure such liquefied gases as hydrocarbon gases, including natural gas, methane, propane, butane and other petroleum gases, and especially liquefied nitrogen and liquefied oxygen. The steels in such pressure vessels exhibit high notch impact resistance above 15 foot-pounds at the low temperatures of these liquefied gases.

In describing the present invention, reference has been made to a possible theoretical explanation of the results obtained on the basis of microstructural constituents. Whatever the true explanation, the facts are that the compositions combined with the treatments within the temperature ranges set forth produce high impact properties at the low temperatures indicated. While the constituents in the matrix of the structure after reheating in accordance with the invention are usually very fine, coarser structures we have obtained and tests we have conducted indicate that the constituents are small areas or islands of stable nickel-containing austenite in a nickel-containing ferrite matrix.

Although the present invention has been described in conjunction with preferred embodiments, it is to be understood that modifications and variations may be resorted to without departing from the spirit and scope of the invention, as those skilled in the art will readily understand. Thus, while the steels contemplated by the invention have been described with particular reference to illustrative examples of normal amounts of steel constituents, e. g., manganese, silicon, phosphorus, sulfur, etc., usually present in commercial steels, the small amounts of these steel constituents may vary considerably depending upon metallurgical control and chemical analysis, as those skilled in the art are well aware and as has been amply described in the prior art, particularly in handbooks and texts (see, for example, the SAE Handbook; Tiemann's Iron and Steel; the Metals Handbook of the American Society for Metals; The Making, Shaping, and Treating of Steels by Camp and Francis; Steel and Its Heat Treatment by Bullens et al.; etc.). Such variations and modifications are considered to be within the purview and scope of the invention and the appended claims.

We claim:

1. A method of producing ferritic steel having high impact resistance at temperatures down to at least about minus 320° F. which comprises subjecting a wrought steel containing about 8% to 15% nickel, about 0.03% to 0.15% carbon and the balance essentially iron to a heat treatment comprising a conditioning treatment of said steel at a temperature for the nickel content at least about 200° F. above the line AB in the drawing, cooling the thus-treated steel to approximately room temperature at a rate at least as rapid as air cooling, heating said steel to a temperature for the nickel content above the line AB in the drawing but at least about 100° F. below the temperature employed in said conditioning treatment, cooling the thus-treated steel to approximately room temperature at a rate at least as rapid as air cooling, thereafter treating said steel at a temperature for the nickel content within the zone CDEF in the drawing, cooling the steel and heating the steel to a temperature for the nickel content not above the zone CDEF in the drawing.

2. A method of producing ferritic steel having high impact resistance at temperatures down to at least about minus 320° F. which comprises subjecting a steel containing about 8% to 15% nickel, a small amount up to about 0.15% carbon and the balance essentially iron to a heat treatment comprising treating said steel at a temperature for the nickel content above the line AB in the drawing, cooling the thus-treated steel at a rate at least as rapid as air cooling to a temperature below the top of the zone CDEF in the drawing, thereafter treating said steel at a temperature for the nickel content within the zone CDEF in the drawing, cooling the thus-treated steel and thereafter heating the steel to a temperature for the nickel content not more than about 25° F. above the zone CDEF in the drawing.

3. A method for producing ferritic steel having high impact strength at temperatures down to at least about minus 320° F. which comprises subjecting a wrought steel containing about 8% to 15% nickel, about 0.03% to 0.15% carbon and the balance essentially iron to a heat treatment comprising a conditioning treatment of said steel at a temperature for the nickel content at least about 200° F. above the line AB in the drawing, cooling the thus-treated steel to approximately room temperature at a rate at least as rapid as air cooling, treating said steel at a temperature for the nickel content at least about 50° F. above the line AB in the drawing but at least about 100° F. below the temperature employed in said conditioning treatment, thereafter cooling the steel to approximately room temperature at a rate at least as rapid as air cooling, and treating the thus-treated steel at a temperature for the nickel content within the zone C'D'E'F' in the drawing.

4. A method for producing ferritic steel having high impact resistance at temperatures down to at least about minus 320° F. which comprises subjecting a steel containing about 8% to 15% nickel, about 0.03% to .015% carbon and the balance essentially iron to a heat treatment comprising treating said steel at a temperature for the nickel content above the line AB in the drawing, cooling the thus-treated steel at a rate at least as rapid as air cooling to a temperature below that where martensite begins to form, and thereafter treating said steel at a temperature for the nickel content within the zone C'D'E'F' in the drawing.

5. A method of producing ferritic steel having high impact resistance at temperatures down to about minus 320° F. which comprises subjecting a steel containing about 8% to 15% nickel, up to about 0.2% carbon and the balance essentially iron to a heat treatment comprising treating said steel at a temperature at least as high as the upper critical temperature of the steel, cooling the thus-treated steel, and thereafter treating said steel at a temperature for the particular nickel content not more than about 25° F. above the zone CDEF in the drawing and not more than about 25° F. below said zone.

6. A method of producing ferritic steel having high impact resistance at temperatures down to at least about minus 320° F. which comprises subjecting a steel containing about 8% to 15% nickel, a small amount up to about 0.15% carbon and the balance essentially iron to a heat treatment comprising a conditioning treatment of said steel at a temperature for the nickel content at least about 200° F. above the line AB in the drawing, thereafter cooling the steel below the line AB in the drawing and to approximately room temperature, treating said steel at a temperature for the nickel content above the line AB in the drawing but at least about 100° F. below the temperature employed in said conditioning treatment, cooling the thus-treated steel and then treating the steel at a temperature for the nickel content within the zone CDEF in the drawing.

7. An article of manufacture subjected in use to low temperatures made of a ferritic alloy steel comprising about 0.03% to 0.2% carbon, about 8% to 15% nickel and the balance essentially iron except for the usual steel constituents, said alloy steel having a structure comprised of small areas of stable austenite in a ferritic matrix.

8. An article of manufacture subjected in use to low temperatures comprised of a wrought ferritic alloy steel containing up to about 0.2% carbon, about 8% to 20% nickel and the balance essentially iron, said steel being in a condition resulting from a treatment comprising cooling from above the upper critical point of the steel and heating at a temperature below the upper critical point where a small amount of stable austenite forms.

9. An article subjected in use to low temperatures comprised of a low carbon ferritic steel containing about 0.03% to 0.2% carbon, over 10% and up to about 15% nickel, a small residual amount from the group consisting of aluminum and titanium, and the balance essentially iron, and having a structure comprised of small areas of stable austenite in a ferrite matrix.

10. A structural element subjected in use to low temperatures below minus 260° F. comprised of a wrought ferritic alloy steel containing about 0.03% to 0.15% carbon, about 8% to 10% nickel, a small residual amount from the group consisting of aluminum and titanium, and the balance essentially iron, said alloy steel being characterized by a structure comprised of a small amount of stable austenite in a matrix of ferrite.

11. A ferritic nickel steel comprising about 0.03% to 0.20% carbon, over 10% and up to about 15% nickel, and the balance essentially iron, said steel being characterized by high impact resistance values approaching non-variance over an extended frigid temperature range down to as low as minus 320° F. and being in a condition resulting from being air cooled from above the upper critical point and reheated at a temperature below the upper critical point where a small amount of stable austenite forms.

12. A low carbon ferritic nickel steel containing about 0.03% to 0.2% carbon, about 8% to 10% nickel and the balance essentially iron plus small amounts of usual steel constituents, said steel being characterized by having a microstructure comprised of small areas of stable austenite in a ferrite matrix.

GERALD ROBERT BROPHY.
ARTHUR JOHN MILLER.

(References on following page)

REFERENCES CITED

The following references are of record in the file of this patent:

UNITED STATES PATENTS

| Number | Name | Date |
|---|---|---|
| 1,905,247 | Scott | Apr. 25, 1933 |
| 2,244,064 | Hodge | June 3, 1941 |
| 2,337,049 | Jackson | Dec. 21, 1943 |

FOREIGN PATENTS

| Number | Country | Date |
|---|---|---|
| 408,632 | Great Britain | Apr. 12, 1932 |
| 409,355 | Great Britain | Apr. 30, 1934 |

Certificate of Correction

Patent No. 2,451,469.  October 19, 1948.

GERALD ROBERT BROPHY ET AL.

It is hereby certified that errors appear in the printed specification of the above numbered patent requiring correction as follows:

Column 5, line 6, after the letter "F" insert a period; column 6, line 43, for the words "and the" read *and then*; column 9, line 71, after the word "conditions" strike out the comma; column 11, line 62, for "condition has" read *condition have*; column 13, line 13, for "impacts" read *impact*; line 47, for "steel" read *steels*; column 19, line 56, for ".015%" read *0.15%*;
and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*